US012670839B2

(12) United States Patent
Jung et al.

(10) Patent No.: US 12,670,839 B2
(45) Date of Patent: Jun. 30, 2026

(54) DISPLAY DEVICE

(71) Applicant: LG Display Co., Ltd., Seoul (KR)

(72) Inventors: Heain Jung, Paju-si (KR); Yangseok Jeong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/988,480

(22) Filed: Dec. 19, 2024

(65) Prior Publication Data

US 2025/0279034 A1 Sep. 4, 2025

(30) Foreign Application Priority Data

Feb. 29, 2024 (KR) ........................ 10-2024-0029519

(51) Int. Cl.
*G09G 3/20* (2006.01)
*G09G 3/3258* (2016.01)

(52) U.S. Cl.
CPC ......... *G09G 3/2096* (2013.01); *G09G 3/3258* (2013.01); *G09G 2300/0819* (2013.01); *G09G 2300/0842* (2013.01); *G09G 2310/0286* (2013.01); *G09G 2310/0289* (2013.01); *G09G 2310/061* (2013.01); *G09G 2310/08* (2013.01); *G09G 2320/0673* (2013.01); *G09G 2330/023* (2013.01); *G09G 2370/08* (2013.01)

(58) Field of Classification Search
CPC ............... G09G 3/2096; G09G 3/3258; G09G 2300/0819; G09G 2300/0842; G09G 2310/0286; G09G 2310/0289; G09G 2310/061; G09G 2310/08; G09G 2320/0673; G09G 2330/023; G09G 2370/08
USPC ........................................................... 345/208
See application file for complete search history.

(56) References Cited

U.S. PATENT DOCUMENTS 11,475,843 B2 * 10/2022 Cho ..................... G09G 3/2088
2010/0238274 A1 * 9/2010 Kim ..................... H04N 13/341 348/51
2010/0289974 A1 * 11/2010 Kim ..................... H04N 13/341 348/51
2011/0001805 A1 * 1/2011 Mentz ................. H04N 13/341 348/E13.059
2012/0212474 A1 * 8/2012 Hwang ................ G09G 3/3648 345/212
2013/0249971 A1 * 9/2013 Lee ...................... H04N 13/125 345/691
2013/0321364 A1 * 12/2013 Chong ................. G09G 3/003 345/204

(Continued)

*Primary Examiner* — Tom V Sheng
(74) *Attorney, Agent, or Firm* — Birch, Stewart, Kolasch & Birch, LLP

(57) ABSTRACT

A display device capable of efficiently using an output of a timing controller is discussed. The display device in one example includes a display panel including sub-pixels at intersections of horizontal lines and vertical lines, a timing controller configured to output left image data among data of the horizontal lines through a first embedded panel interface (EPI) output unit and output right image data among the data of the horizontal lines through a second EPI output unit, and a data driver configured to output data voltages to data lines based on the left image data and the right image data. Accordingly, it is possible to reduce power consumed by the display device by efficiently using the output of the timing controller.

20 Claims, 13 Drawing Sheets

(56) References Cited

U.S. PATENT DOCUMENTS

| | | | | |
|---|---|---|---|---|
| 2014/0354706 | A1* | 12/2014 | Yoon | H04N 13/341 345/690 |
| 2016/0055818 | A1* | 2/2016 | Kim | G11C 19/287 345/95 |
| 2020/0152109 | A1* | 5/2020 | Jung | G09G 3/035 |
| 2021/0193074 | A1* | 6/2021 | Kim | G09G 3/3208 |
| 2023/0177992 | A1* | 6/2023 | Kim | G09G 3/20 |
| 2025/0273131 | A1* | 8/2025 | Park | G09G 3/32 |

* cited by examiner

M x N pixels

DISPLAY DEVICE

CROSS REFERENCE TO RELATED APPLICATION

The present application claims priority to Korean Patent Application No. 10-2024-0029519, filed in the Republic of Korea on Feb. 29, 2024, the entire contents of which is hereby expressly incorporated by reference into the present application.

BACKGROUND OF THE INVENTION

Field of the Invention

The present disclosure relates to a display device, and more specifically, to a display device capable of efficiently using an output of a timing controller.

Discussion of the Related Art

Recently, as the information age enters, a display field in which electrical information signals are visually expressed has developed rapidly, and in response thereto, various display devices having excellent performance, such as thinness, lightness, and low power consumption, are being developed.

Specific examples of display devices can include a liquid crystal display (LCD) device, an organic light emitting diode (OLED) display device, a quantum dot (QD) display device, etc.

Such a display device uses a timing controller, a data driver, a display panel etc. for an operation thereof.

SUMMARY OF THE INVENTION

The present disclosure is directed to providing a display device in which consumed power can be reduced by efficiently using an output of a timing controller of a display device.

A display device according to one embodiment of the present disclosure can include a display panel including sub-pixels at intersections of horizontal lines and vertical lines, a timing controller configured to output left image data among data of the horizontal lines through a first embedded panel interface (EPI) output unit and output right image data among the data of the horizontal lines through a second EPI output unit, and a data driver configured to output data voltages to data lines based on the left image data and the right image data, wherein the timing controller can transmit only different data through at least one of the first EPI output unit and the second EPI output unit when data of a first horizontal line and data of a second horizontal line that are consecutive are partially different with respect to the vertical line.

According to an aspect of the present disclosure, the timing controller can stop the output of the first EPI output unit when the left image data of the first horizontal line and the left image data of the second horizontal line that are consecutive are all the same, and transmit only different data through the first EPI output unit when the left image data of the first horizontal line and the left image data of the second horizontal line that are consecutive are partially different.

According to an aspect of the present disclosure, the timing controller can transmit all the left image data of the horizontal lines through the first EPI output unit when the number of data, which differs from the left image data of the first horizontal line and the left image data of the second horizontal line that are consecutive, is half or more the number of data of all horizontal lines.

According to an aspect of the present disclosure, the timing controller can stop the output of the second EPI output unit when the right image data of the first horizontal line and the right image data of the second horizontal line that are consecutive are all the same and transmit only different data through the second EPI output unit when the right image data of the first horizontal line and the right image data of the second horizontal line that are consecutive are partially different.

According to an aspect of the present disclosure, the timing controller can transmit all the right image data of the horizontal lines through the second EPI output unit when the number of different data between the right image data of the first horizontal line and the right image data of the second horizontal line that are consecutive, is half or more the number of data of all horizontal lines.

According to an aspect of the present disclosure, the timing controller can transmit only different data through one of the first EPI output unit and the second EPI output unit when the sum of the number of different data between the left image data of the first horizontal line and the left image data of the second horizontal line that are consecutive and the number of different data between the right image data of the first horizontal line and the right image data of the second horizontal line is less than half the number of data of all horizontal lines.

According to an aspect of the present disclosure, the timing controller can transmit a clock training signal for a first period before the first EPI output unit or the second EPI output unit starts the output.

According to an aspect of the present disclosure, the left image data can include left image update data in which the left image data of the first horizontal line and the left image data of the second horizontal line that are consecutive are partially different, and the first EPI output unit can output only the left image update data.

According to an aspect of the present disclosure, the first EPI output unit can output all the left image data when the number of left image update data is half or more the number of data of all horizontal lines.

According to an aspect of the present disclosure, the right image data can include right image update data in which the right image data of the first horizontal line and the right image data of the second horizontal line that are consecutive are partially different, and the second EPI output unit can output only the right image update data.

According to an aspect of the present disclosure, the second EPI output unit can output all the right image data when the number of right image update data is half or more the number of data of all horizontal lines.

According to an aspect of the present disclosure, the first EPI output unit can output all of the left image update data and the right image update data when the sum of the number of left image update data and the number of right image update data is less than half the number of data of all horizontal lines, and the second EPI output unit can stop the output.

According to an aspect of the present disclosure, the second EPI output unit can output all of the left image update data and the right image update data when the sum of the number of left image update data and the number of right image update data is less than half the number of data of all horizontal lines, and the second EPI output unit can stop the output.

A timing controller according to one embodiment of the present disclosure can include a first embedded panel interface (EPI) output unit configured to output left image data among data of a horizontal line, and a second EPI output unit configured to output right image data among the data of the horizontal line, wherein the timing controller can transmit only different data through at least one of the first EPI output unit and the second EPI output unit when data of a first horizontal line and data of a second horizontal line that are consecutive are partially different with respect to a vertical line.

According to an aspect of the present disclosure, the first EPI output unit can stop the output when the left image data of the first horizontal line and the left image data of the second horizontal line that are consecutive are all the same and transmit only different data when the left image data of the first horizontal line and the left image data of the second horizontal line that are consecutive are partially different.

According to an aspect of the present disclosure, the first EPI output unit can output all the left image data of the horizontal lines when the number of different data between the left image data of the first horizontal line and the left image data of the second horizontal line that are consecutive, is half or more the number of data of all horizontal lines.

According to an aspect of the present disclosure, the second EPI output unit can stop the output when the right image data of the first horizontal line and the right image data of the second horizontal line that are consecutive are all the same and transmit only different data when the right image data of the first horizontal line and the right image data of the second horizontal line that are consecutive are partially different.

According to an aspect of the present disclosure, the second EPI output unit can output all the right image data of the horizontal lines when the number of different data between the right image data of the first horizontal line and the right image data of the second horizontal line that are consecutive, is half or more the number of data of all horizontal lines.

According to an aspect of the present disclosure, one of the first EPI output unit and the second EPI output unit can output only different data when the sum of the number of different data between the left image data of the first horizontal line and the left image data of the second horizontal line that are consecutive and the number of different data between the right image data of the first horizontal line and the right image data of the second horizontal line is less than half the number of data of all horizontal lines.

According to an aspect of the present disclosure, the first EPI output unit or the second EPI output unit can output a clock training signal for a first period before starting the output.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
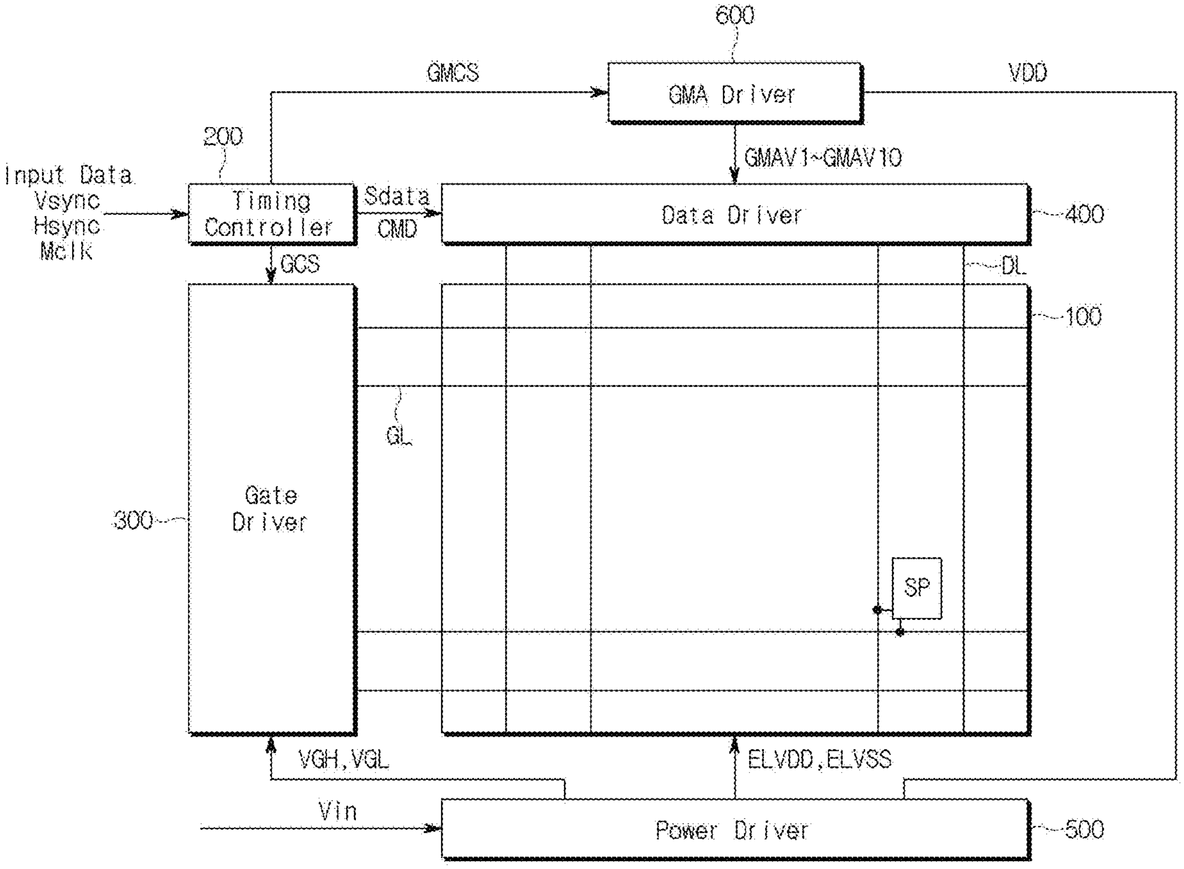
FIG. 1 is a block diagram showing a display device according to embodiments of the present disclosure.

Advantages and features of the present disclosure and methods for achieving them will become clear with reference to embodiments described below in detail in conjunction with the accompanying drawings. The present disclosure is not limited to the embodiments disclosed below but can be implemented in various different forms, these embodiments are merely provided to make the disclosure of the present disclosure complete and fully inform those skilled in the art to which the present disclosure pertains of the scope of the present disclosure, and the present disclosure is only defined by the scope of the appended claims.

Since shapes, sizes, ratios, angles, numbers, and the like disclosed in the drawings for describing the embodiments of the present disclosure are illustrative, the present disclosure is not limited to the shown items. The same reference number indicates the same components throughout the disclosure. In addition, in describing the present disclosure, when it is determined that the detailed description of a related known technology can unnecessarily obscure the gist of the present disclosure, detailed description thereof will be omitted.

When the terms "comprise," "include," "have," and "consist of" described in the present disclosure are used, other parts can be added unless "only" is used. When a component is expressed in the singular, it can be construed as a plurality of components unless specifically stated otherwise.

In construing a component, the component is construed as including the margin of error even when there is no separate explicit description.

When the positional relationship is described, for example, when the positional relationship between two components is described using the term "on," "above," "under," "next to," or the like, one or more other components can be positioned between the components unless the term "immediately" or "directly" is used.

Although the term "first," "second," or the like can be used to distinguish components, functions or structures of the components are not limited by the ordinal number or component name added to the front of the component.

The following embodiments can be partially or fully coupled or combined, and various technological interworking and driving are possible. The embodiments can be implemented independently of each other and implemented together in the associated relationship.

A driving circuit of a display device according to an aspect of the present disclosure can write pixel data of input images into pixels. A driving circuit of a flat panel display device can include a data driver for supplying data signals to data lines, and a gate driver for supplying gate signals to gate lines.

In the display device according to the present disclosure, each of a pixel circuit and a gate driver can include a plurality of transistors and can be formed directly on a substrate of a display panel. The transistor can be implemented as a thin film transistor (TFT) having a metal-oxide-semiconductor field effect transistor (MOSFET) structure and can be an oxide TFT containing an oxide semiconductor or a low temperature polysilicon (LTPS) TFT containing LTPS.

A transistor is a three-electrode element including a gate, a source, and a drain. The source is an electrode for supplying carriers to the transistor. The carriers start to flow from the source in the transistor. The drain is an electrode through which the carriers moves from the transistor to the outside. In the transistor, flows of the carriers flow from the source to the drain. In the case of an n-channel transistor, since the carriers are electrons, a source voltage has a lower voltage than a drain voltage so that the electrons can flow from the source to the drain. In the n-channel transistor, a direction of the current flows from the drain to the source. In the case of a p-channel transistor, since the carriers are holes, the source voltage is higher than the drain voltage so that the holes can flow from the source to the drain. In the p-channel transistor, a current flows from the source to the drain because the holes flow from the source to the drain. It should be noted that the source and drain of the transistor are not fixed. For example, the source and the drain can be changed depending on an applied voltage. Therefore, the disclosure is not limited by the source and drain of the transistor. In the following description, the source and drain of the transistor are referred to as "first and second electrodes."

A gate signal can swing between a gate-on voltage and a gate-off voltage. The gate-on voltage is set to a voltage higher than a threshold voltage of the transistor. The gate-off voltage is set to a voltage lower than the threshold voltage of the transistor.

While the transistor is turned on in response to the gate-on voltage, the transistor is turned off in response to the gate-off voltage. In the case of the n-channel transistor, the gate-on voltage can be a gate high voltage VGH or VEH, and the gate-off voltage can be a gate low voltage VGL or VEL. In the case of the p-channel transistor, the gate-on voltage can be the gate low voltage VGL or VEL, and the gate-off voltage can be the gate high voltage VGH or VEH. In the following embodiments, although an example in which transistors of a pixel circuit are implemented as p-channel transistors will be mainly described, it should be noted that the present disclosure is not limited thereto.

Further, the term "can" fully encompasses all the meanings and coverages of the term "may."

Hereinafter, various embodiments of the present disclosure will be described in detail with reference to the accompanying drawings. In the following embodiments, although an example in which the display device is an OLED display device, the present disclosure is not limited thereto. All the components of each display device according to all embodiments of the present disclosure are operatively coupled and configured.

FIG. 1 is a block diagram showing a display device according to embodiments of the present disclosure.

Referring to FIG. 1, the display device according to embodiments of the present disclosure can include a display panel 100, a timing controller 200, a gate driver 300, a data driver 400, a power driver 500, and a gamma driver 600.

The display panel 100 includes a pixel array in which input images are displayed on a screen. The pixel array includes a plurality of data lines DL, a plurality of gate lines GL intersecting the data lines DL, and sub-pixels SP disposed in a matrix form.

The display panel 100 can be implemented as a non-transmissive display panel or a transmissive display panel. The display panel 100 can be manufactured as a flexible display panel. The flexible display panel can be implemented as an OLED panel using a plastic substrate.

The timing controller 200 can receive digital video data Data of input images and timing signals Vsync, Hsync, and Clk synchronized therewith from a set system. The digital video data is a differential data signal and can be serial data. The timing signals can include the vertical synchronization signal Vsync, the horizontal synchronization signal Hsync, and the clock Clk. The set system can include a TV, a monitor, a set-top box, a navigation system, a personal computer, a home theater system, a mobile device, a wearable device, a vehicle system, etc.

The timing controller 200 can control an operation timing of the display panel 100 according to an input frequency. The input frequency can be 60 Hz in a national television standards committee (NTSC) format. Recently, display devices driven at a higher frequency of 120 Hz have become popular. In addition, the display device driven at 120 Hz can be controlled to be temporarily driven at 60 Hz in some cases. In addition, recently, display devices that support a variable refresh rate (VRR) at which the display device is operated by decreasing a frame frequency to a frequency between 1 Hz and 30 Hz in a low-speed driving mode and increasing the frame frequency to 144 Hz in the case of high resolution images (e.g., a gaming mode) have been developed.

The timing controller 200 can output serial image data Data provided to the data driver 400, a command signal CMD for controlling the data driver 400, a gate control signal GCS for controlling the gate driver 300, and a gamma control signal GMCS for driving the gamma driver 600 based on the received timing signals Vsync, Hsync, and Clk.

The gate driver 300 can be implemented as a gate in panel (GIP) circuit formed directly on the display panel 100 together with a TFT array of a pixel array and lines. The gate driver 300 can sequentially output the gate signals to the gate lines GL under the control of the timing controller 200. The gate driver 300 can sequentially output the signals to the plurality of gate lines GL by shifting the gate signals using a shift register.

The data driver 400 can convert pixel data of the input images received as digital signals from the timing controller 200 every frame period using a digital-to-analog converter and gamma reference voltages GMAV1 to GMAV10 provided from the gamma driver 600 into gamma compensation voltages and output data voltages. The data driver 400 can be implemented as a plurality of source drive integrated circuits. The data driver 400 can be electrically connected to the data lines DL of the display panel 100 through a chip on glass (COG) process or a tape automated bonding (TAB) process.

The power driver 500 can output DC (direct current) powers required to drive the pixel array of the display panel 100 and the drivers 300, 400, and 600 using a DC-DC converter. The power driver 500 can receive a DC input voltage Vin and output DC voltages such as a gate high voltage VGH, a gate low voltage VGL, a high potential power voltage ELVDD, a low potential power voltage ELVSS, a high potential reference voltage VDD, etc.

Specifically, the gate high voltage VGH is a voltage set to threshold voltages or more of transistors formed in an array of sub-pixels SP. The gate high voltage VGH can be output to the gate driver 300 and supplied to the level shifter in the gate driver 300.

The gate low voltage VGL is a voltage smaller than the threshold voltages of the transistors formed in the array of the sub-pixels SP. The gate low voltage VGL can be supplied to the level shifter in the gate driver 300.

The high potential power voltage ELVDD is a voltage supplied to an anode of a light emitting element and is a positive voltage for driving the light emitting element. The high potential power voltage ELVDD can be supplied to a high potential power voltage line connected to each sub-pixel SP in the display panel 100.

The low potential power voltage ELVSS is a voltage supplied to a cathode of a light emitting element and is a negative voltage for driving the light emitting element. The low potential power voltage ELVSS can be supplied to a low potential power voltage line connected to each sub-pixel SP in the display panel 100.

The high potential reference voltage VDD is a voltage output to the gamma driver 600. The high potential reference voltage VDD can be used as a reference for generating the gamma reference voltages GMAV1 to GMAV10.

The gamma driver 600 can receive the high potential reference voltage VDD output from the power driver 500. The gamma driver 600 can receive the gamma control signal GMCS from the timing controller 200 and generate the gamma reference voltages GMAV1 to GMAV10 having values between the high potential reference voltage VDD and the ground voltage (0 V), and the data driver 400 can output data voltages based on the gamma reference voltages GMAV1 to GMAV10.

Figure 2:
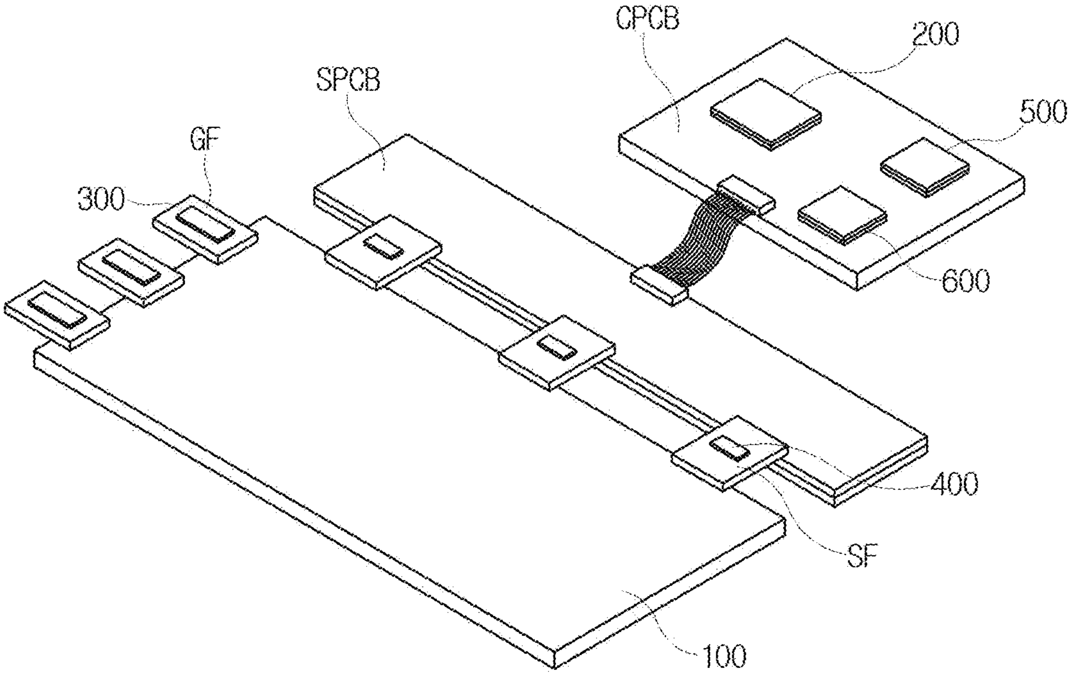
FIG. 2 is an exemplary view showing systematic implementation of a display device according to the embodiments of the present disclosure.

FIG. 2 is an exemplary view showing systematic implementation of a display device according to the embodiments of the present disclosure.

Referring to FIG. 2, each of the plurality of data drivers 400 can be mounted on a source film SF and electrically connected to the display panel 100. One side of the source film SF can be connected to the display panel 100, and the other side can be connected to a source printed circuit board SPCB.

Each of the plurality of gate drivers 300 can be mounted on a gate film GF and electrically connected to the display panel 100.

The timing controller 200, the power driver 500, the gamma driver 600, etc. can be mounted on a control printed circuit board CPCB. The timing controller 200 can control operations of the data driver 400, the gate driver 300, etc., and the power driver 500 can supply various voltages or currents to the display panel 100, the data driver 400, the gate driver 300, etc. or control various voltages or currents to be supplied to the display panel 100, the data driver 400, the gate driver 300, etc. The gamma driver 600 can receive the gamma control signal GMCS from the timing controller 200 and generate the gamma reference voltages GMAV1 to GMAV10.

The at least one source printed circuit board SPCB and the control printed circuit board CPCB can be circuitally connected through at least one connection member. Here, the connection member can be, for example, a flexible printed circuit (FPC), a flexible flat cable (FFC), etc. In addition, the source printed circuit board SPCB and the control printed circuit board CPCB can be implemented by being integrated into one printed circuit board.

Figure 3:
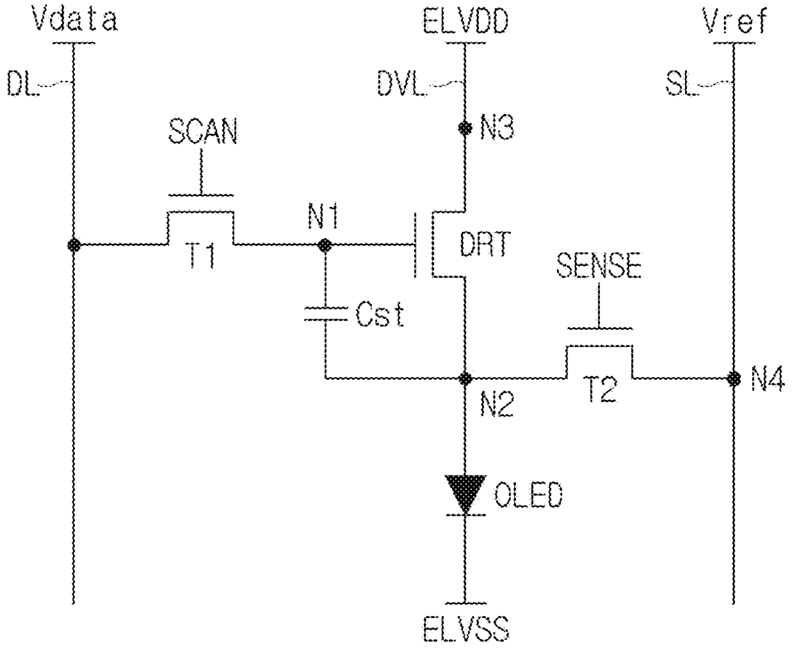
FIG. 3 is a circuit diagram showing a sub-pixel circuit of a display device according to the embodiments of the present disclosure.

FIG. 3 is a circuit diagram showing a sub-pixel circuit of a display device according to the embodiments of the present disclosure.

Referring to FIG. 3, in the display panel 100 according to the embodiments of the present disclosure, a plurality of data lines DL, a plurality of gate lines GL, a plurality of driving voltage lines DVL, a plurality of sensing lines SL, etc. can be disposed.

Each subpixel SP in the display panel 100 can include an organic light emitting diode OLED, a driving transistor DRT for driving the organic light emitting diode OLED, a first transistor T1 electrically connected between a first node N1 of the driving transistor DRT and the corresponding data line DL, a second transistor T2 electrically connected between a second node N2 of the driving transistor DRT and the corresponding sensing line SL among a plurality of sensing lines SL, a storage capacitor Cst electrically connected between the first node N1 and the second node N2 of the driving transistor DRT, a line capacitor Cline connected to the sensing line SL, etc.

The organic light emitting diode OLED can include an anode, an organic light emitting layer, a cathode, etc.

The anode of the organic light emitting diode OLED can be electrically connected to the second node N2 of the driving transistor DRT. The low potential power voltage ELVSS can be applied to the cathode of the organic light emitting diode OLED.

Here, the low potential power voltage ELVSS can be, for example, a ground voltage or a higher or lower voltage than the ground voltage. In addition, the low potential power voltage ELVSS can be changed depending on a driving state.

For example, the low potential power voltage ELVSS during imaging driving and the low potential power voltage ELVSS during sensing driving can be set differently.

The driving transistor DRT drives the organic light emitting diode OLED by supplying a driving current to the organic light emitting diode OLED.

The driving transistor DRT can include the first node N1, the second node N2, a third node N3, etc.

The first node N1 of the driving transistor DRT can be a gate node and can be electrically connected to a source node or drain node of the first transistor T1. The second node N2 of the driving transistor DRT can be a source node or a drain node, electrically connected to an anode (or a cathode) of the organic light emitting diode OLED, and electrically connected to a source node or drain node of the second transistor T2. The third node N3 of the driving transistor DRT can be a drain node or a source node, can receive the high potential power voltage ELVDD, and can be electrically connected to a driving voltage line DVL through which the high potential power voltage ELVDD is supplied. Hereinafter, for convenience of description, an example in which in the driving transistor DRT, the first node N1 is a gate node, the second node N2 is a source node, and the third node N3 is a drain node can be described.

The storage capacitor Cst can be electrically connected between the first node N1 and the second node N2 of the driving transistor DRT to maintain a data voltage Vdata corresponding to an image signal voltage or a voltage corresponding thereto for a frame time (or a set time).

The drain node or source node of the first transistor T1 can be electrically connected to the corresponding data line DL, the source node or drain node of the first transistor T1 can be electrically connected to the first node N1 of the driving transistor DRT, and the gate node of the first transistor T1 can be electrically connected to the corresponding gate line to receive a scan signal SCAN.

The first transistor T1 can be controlled to be turned on and off by receiving the scan signal SCAN at the gate node through the corresponding gate line.

The first transistor T1 can be turned on by the scan signal SCAN to transmit the data voltage Vdata supplied from the corresponding data line DL to the first node N1 of the driving transistor DRT.

The drain node or source node of the second transistor T2 can be electrically connected to the sensing line SL, and the source node or drain node of the second transistor T2 can be electrically connected to the second node N2 of the driving transistor DRT. The gate node of the second transistor T2 can be electrically connected to the corresponding gate line to receive a sense signal SENSE.

The second transistor T2 can be controlled to be turned on and off by receiving the sense signal SENSE at the gate node through the corresponding gate line.

The second transistor T2 can be turned on by the sense signal SENSE to transmit a reference voltage Vref supplied from the corresponding sensing line SL to the second node N2 of the driving transistor DRT.

Meanwhile, the storage capacitor Cst can be an external capacitor intentionally designed outside the driving transistor DRT rather than parasitic capacitors (e.g., Cgs and Cgd) that are internal capacitors present between the first node N1 and the second node N2 of the driving transistor DRT.

The driving transistor DRT, the first transistor T1, and the second transistor T2 can each be an n-type transistor or a p-type transistor.

Meanwhile, the scan signal SCAN and the sense signal SENSE can be separate gate signals. In this case, the scan signal SCAN and the sense signal SENSE can be applied to the gate node of the first transistor T1 and the gate node of the second transistor T2, respectively, through different gate lines.

In some cases, the scan signal SCAN and the sense signal SENSE can be the same gate signal. In this case, the gate signal SCAN and the sensing signal SENSE can be commonly applied to the gate node of the first transistor T1 and the gate node of the second transistor T2, respectively, through the same gate line.

A structure of each sub-pixel shown in FIG. 3 has a 3T (transistor) 1C (capacitor) structure, which is only an example for description, and the sub-pixel can further include one or more transistors or in some cases, one or more capacitors. Alternatively, each of the plurality of sub-pixels can have the same structure, and some of the plurality of sub-pixels can have different structures.

Figure 4:
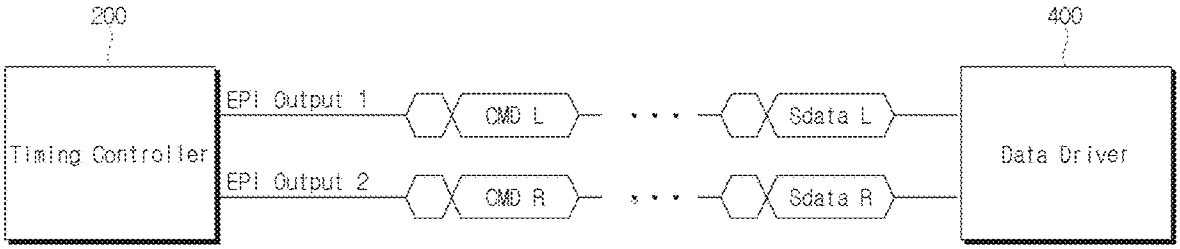
FIG. 4 is a block diagram showing serial image data that is output from a timing controller to a data driver of a display device according to the embodiments of the present disclosure.

FIG. 4 is a block diagram showing serial image data output from a timing controller to a data driver of a display device according to the embodiments of the present disclosure.

Referring to FIG. 4, the timing controller 200 can output serial image data Sdata provided to the data driver 400, and command data CMD for controlling the data driver 400.

The image data Sdata and the command data CMD can be 8-bit or 10-bit serial data including flag bits (00, 11). However, the present disclosure is not limited thereto.

The timing controller 200 can transmit the image data Sdata and the command data CMD using an embedded panel interface (EPI). The first EPI output unit EPI Output 1 of the timing controller 200 can output left image data Sdata L and left command data CMD L. The second EPI output unit EPI Output 2 of the timing controller 200 can output the right image data Sdata R and the right command data CMD R.

Figure 5:
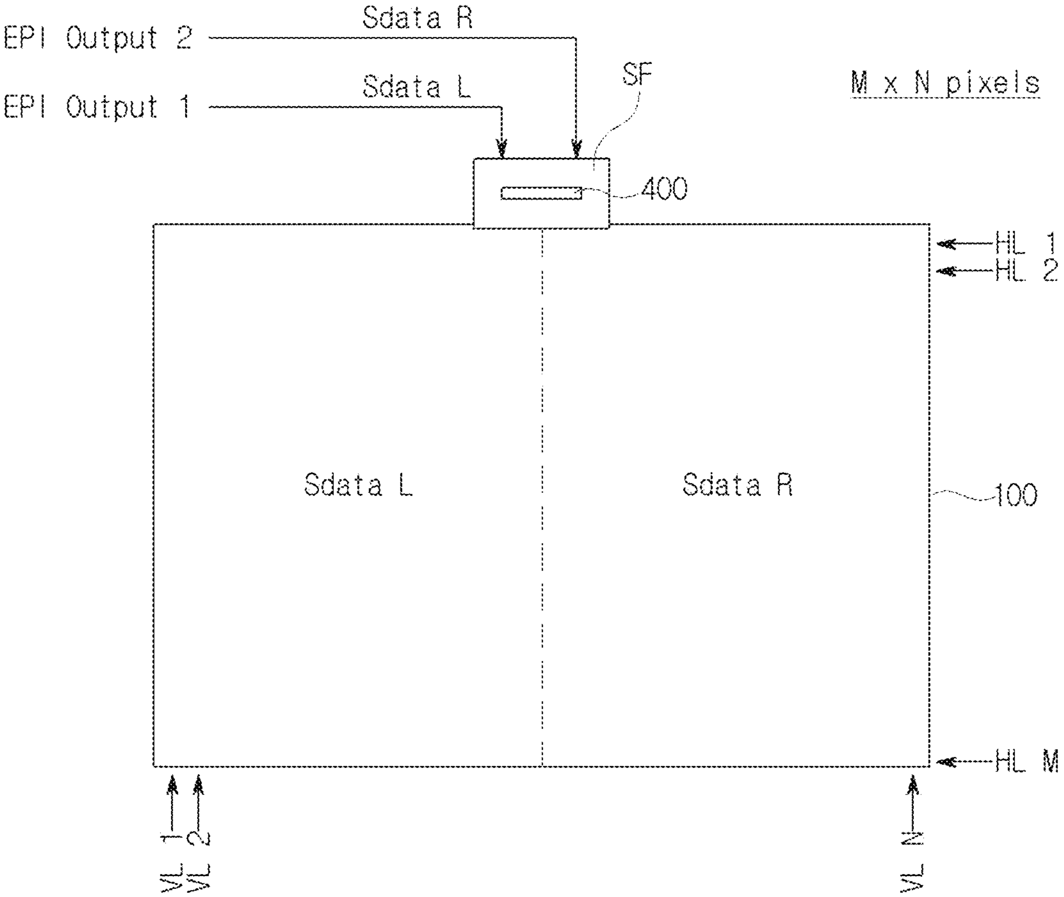
FIG. 5 is a block diagram showing outputs of a first EPI output unit and a second EPI output unit of the display device according to the embodiments of the present disclosure.

FIG. 5 is a block diagram showing outputs of a first EPI output unit and a second EPI output unit of the display device according to the embodiments of the present disclosure.

Referring to FIGS. 1 and 5, the data driver 400 can consecutively output data of a first horizontal line HL 1 to an Mth horizontal line HL M. A leftmost data of the first horizontal line HL 1 can be data corresponding to the first vertical line VL 1. In addition, a rightmost data of the first horizontal line HL 1 can be data corresponding to an $N^{th}$ vertical line VL N. Here, each of N and M can be a real number such as an integer greater than 1

Referring to FIG. 5, the first EPI output unit EPI Output 1 can transmit the left image data Sdata L corresponding to the left side of the display panel 100 to the data driver 400. The second EPI output unit EPI Output 2 can transmit the right image data Sdata R corresponding to the right side of the display panel 100 to the data driver 400.

The left image data Sdata L can be first output to a left area of the first horizontal line HL 1 of the display panel 100, and the left image data Sdata L of the second horizontal line HL 2 can be output after the data of the first horizontal line HL 1 is output. The left image data Sdata L can be sequentially output to the left area of the Mth horizontal line HL M of the display panel 100.

The right image data Sdata R can be first output to a right area of the first horizontal line HL 1 of the display panel 100, and the right image data Sdata R of the second horizontal line HL 2 can be output after the data of the first horizontal line HL 1 is output. The right image data Sdata R can be sequentially output to the right area of the Mth horizontal line HL M of the display panel 100.

Although the first EPI output unit EPI Output 1 and the second EPI output unit EPI Output 2 are described as transmitting the left image data Sdata L and the right image data Sdata R that correspond to the entire left side and the entire right side of the display panel 100, respectively, the left image data Sdata L and the right image data Sdata R can be a left sub-pixel (e.g., R/W) and a right sub-pixel (e.g., B/G), respectively, in one pixel. Alternatively, the left image data Sdata L can be first image data corresponding to one area of the display panel 100, and the right image data Sdata R can be the second image data corresponding to another area of the display panel 100.

Figure 6:
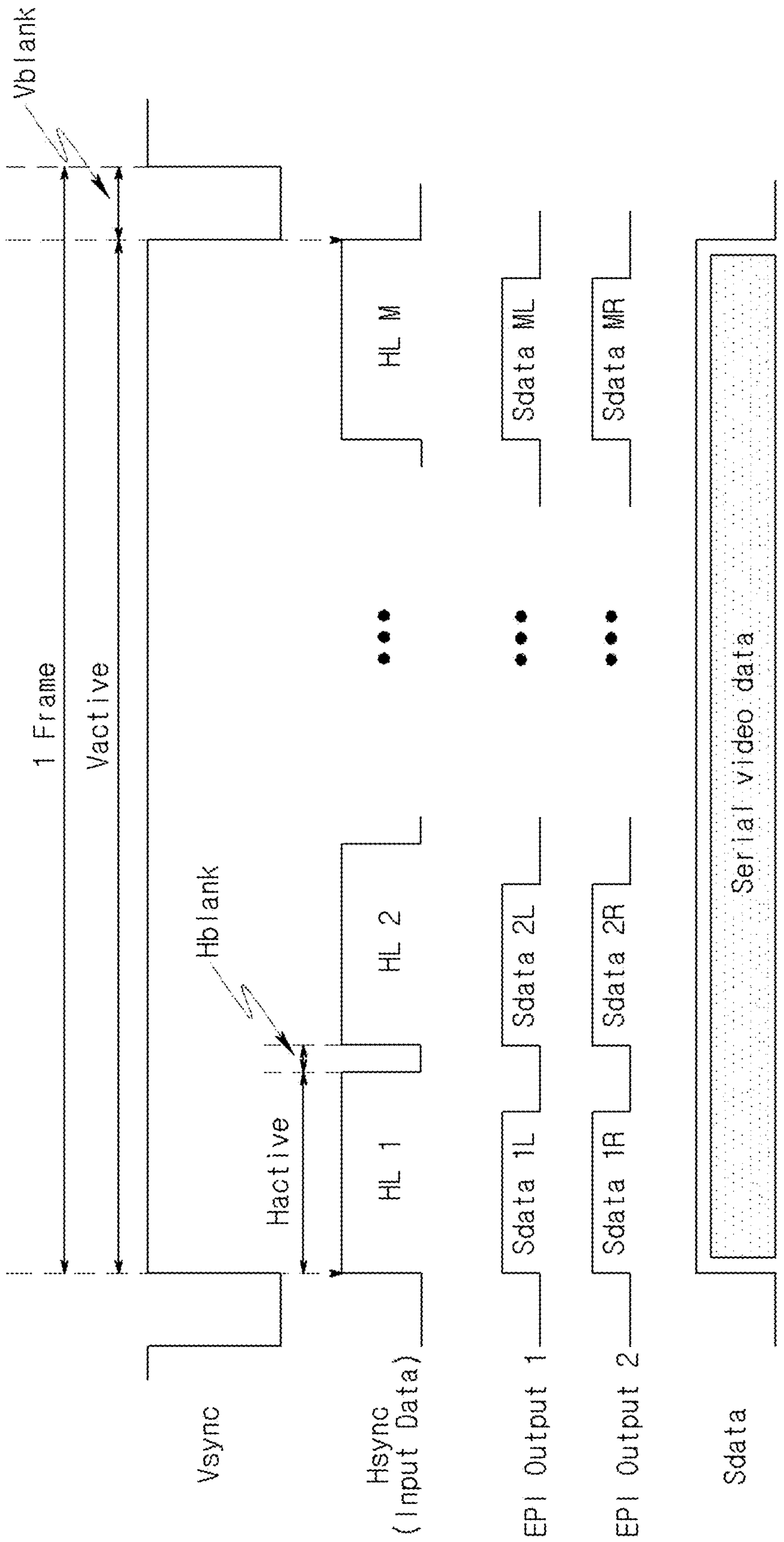
FIG. 6 is a timing diagram showing left image data and right image data of the display device according to the embodiments of the present disclosure.

FIG. 6 is a timing diagram showing left image data and right image data of the display device according to the embodiments of the present disclosure.

Referring to FIG. 6, the image data Sdata can be included in a vertical activation area Vactive excluding a vertical blank area Vblank from the vertical synchronization signal Vsync corresponding to one frame Frame. For example, when the resolution of the display panel 100 is M×N pixels, the vertical activation area Vactive can include M horizontal lines HL1 to HL M.

The M horizontal lines HL1 to HL M of the input data Input Data can be divided into the left image data Sdata L and the right image data Sdata R through the first EPI output unit EPI Output 1 and the second EPI output unit EPI Output 2 in a horizontal activation area Hactive excluding a horizontal blank area Hblank from the horizontal synchronization signal Hsync and transmitted to the data driver 400. In other words, the data corresponding to the first horizontal line HL 1 can be divided into first left image data Sdata 1L and first right image data Sdata 1R and transmitted to the data driver 400, and the data corresponding to the second horizontal line HL 2 can be divided into second left image data Sdata 2L and second right image data Sdata 2R and transmitted to the data driver 400.

Figure 7:
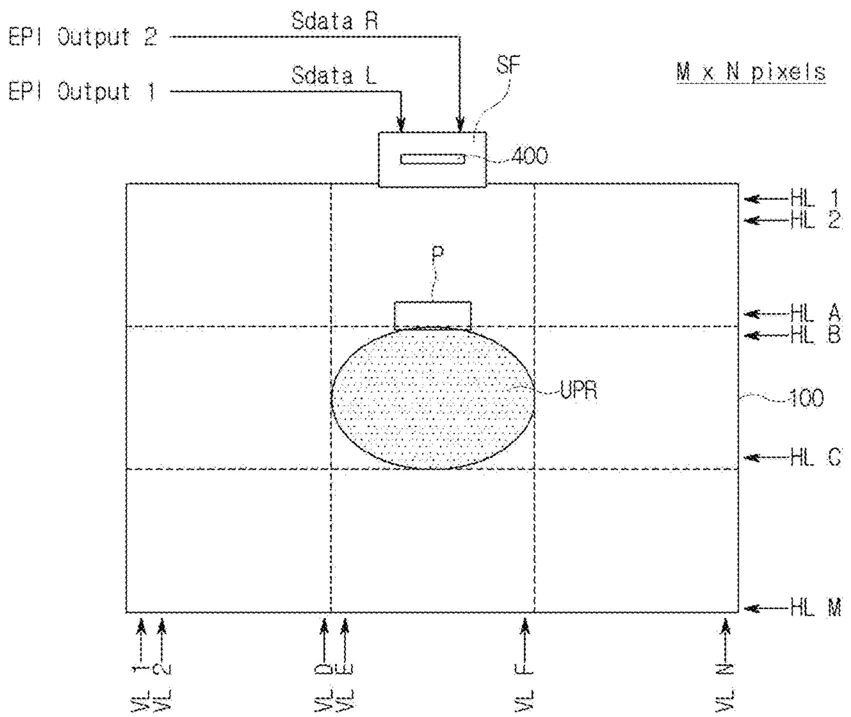
FIG. 7 is a block diagram showing an update area of the display device according to the embodiments of the present disclosure.

FIG. 7 is a block diagram showing an update area of the display device according to the embodiments of the present disclosure.

Referring to FIG. 7, the first EPI output unit EPI Output 1 can transmit the left image data Sdata L corresponding to the left side of the display panel 100 to the data driver 400. The second EPI output unit EPI Output 2 can transmit the right image data Sdata R corresponding to the right side of the display panel 100 to the data driver 400.

An update area UPR of the display panel 100 having the resolution of M×N pixels can be defined as an area from a Bth horizontal line HL B to a Cth horizontal line HL C with respect to the horizontal line HL and an area from an Eth vertical line VL E to an Fth vertical line VL F with respect to the vertical line VL for one frame. An area P in which the update starts with respect to the horizontal line HL can be defined as an area between an Ath horizontal line HL A and the Bth horizontal line HL B.

In other words, the update area UPR can be defined as an area in which pixel data between adjacent horizontal lines is changed when the data driver 400 consecutively outputs data of the first horizontal line HL 1 to the Mth horizontal line HL M for one frame.

Figure 8:
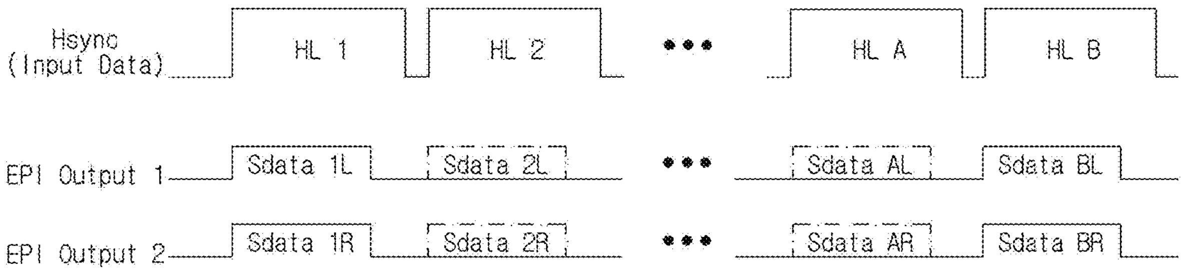
FIG. 8 is a timing diagram showing that the outputs of the left and the right image data at an upper end of the update area of the display device according to the embodiments of the present disclosure are stopped.

FIG. 8 is a timing diagram showing outputs of the left image data and the right image data of the update area of the display device according to the embodiments of the present disclosure.

Referring to FIGS. 7 and 8, there is no change in the left image data Sdata 1L to Sdata AL and the right image data Sdata 1R to Sdata AR of the input data Input Data from the first horizontal line HL 1 to the Ath horizontal line HL A with respect to the horizontal line HL, and when the input data Input Data is the Bth horizontal line HL B with respect to the horizontal line HL, the update of the image data Sdata occurs.

In this case, the first EPI output unit EPI Output 1 can stop the output from the second left image data Sdata 2L to the Ath left image data Sdata AL, and the second EPI output unit EPI Output 2 can stop the output from the second right image data Sdata 2R to the Ath right image data Sdata AR.

Then, the first EPI output unit EPI Output 1 and the second EPI output unit EPI Output 2 can resume the output from Bth left image data Sdata BL and Bth right image Sdata BR at which the reference update area UPR starts with respect to the horizontal line HL.

Figure 9:
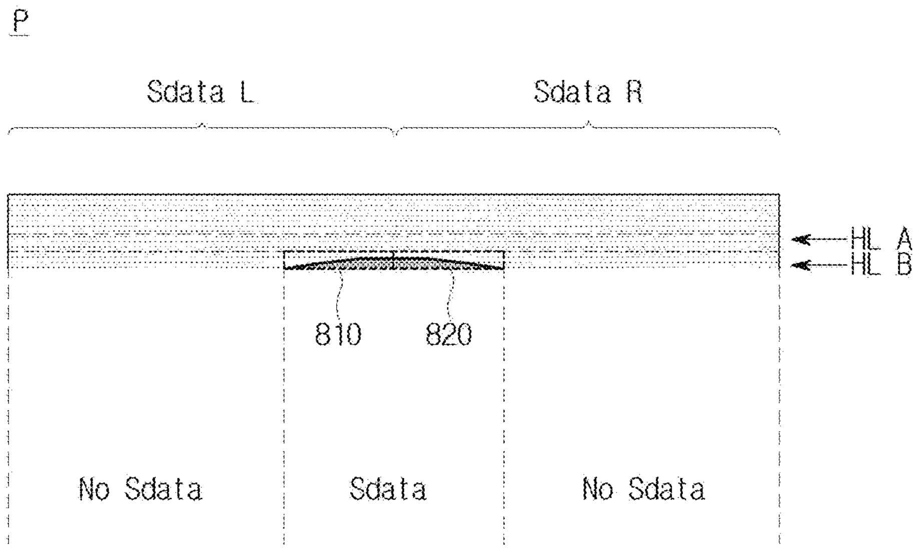
FIG. 9 is an enlarged block diagram of the upper end of the update area of the display device according to the embodiments of the present disclosure.

FIG. 9 is an enlarged block diagram of the upper end of the update area of the display device according to the embodiments of the present disclosure.

Referring to FIG. 9, the area P in which the update starts with respect to the horizontal line HL can be defined as an area between the Ath horizontal line HL A and the Bth horizontal line HL B. The area P in which the update starts can include an update area 810 of the left image data Sdata L and an update area 820 of the right image data Sdata R. In other words, the update area UPR of the B horizontal line HL B can be divided into the B left image update area 810 and the B right image update area 820.

Figure 10:
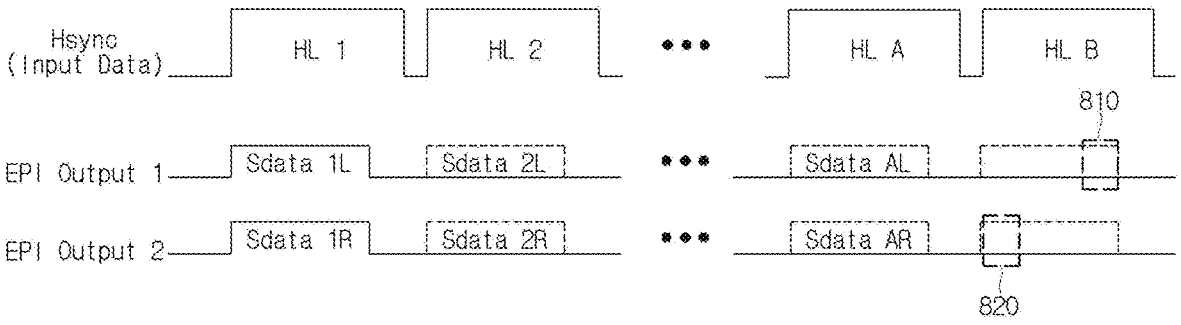
FIG. 10 is a block diagram showing image data that is output from a first EPI output unit and a second EPI output unit according to a first embodiment of the present disclosure.

FIG. 10 is a block diagram showing image data output from a first EPI output unit and a second EPI output unit according to a first embodiment of the present disclosure.

Referring to FIGS. 9 and 10, the first EPI output unit EPI Output 1 can stop the output from the second left image data Sdata 2L to the Ath left image data Sdata AL of the input data Input Data corresponding to the horizontal lines from the second horizontal line HL 2 to the Ath horizontal line HL A with respect to the horizontal line HL, and the second EPI output unit EPI Output 2 can stop the output from the second right image data Sdata 2R to the Ath right image data Sdata AL of the input data Input Data corresponding to the horizontal lines from the second horizontal line HL 2 to the Ath horizontal line HL A with respect to the horizontal line HL.

Then, the first EPI output unit EPI Output 1 and the second EPI output unit EPI Output 2 can resume only the output of the Bth left image update area 810 and the Bth right image update area 820 of the area P in which the update starts.

Figure 11:
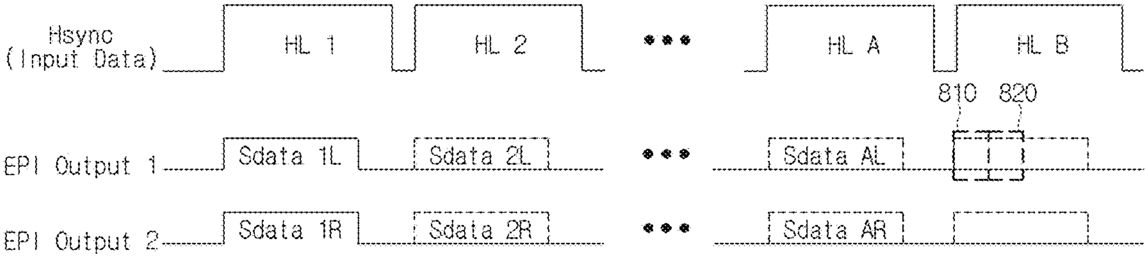
FIGS. 11 and 12 are block diagrams showing image data that is output from a first EPI output unit and a second EPI output unit according to a second embodiment of the present disclosure.
Figure 12:
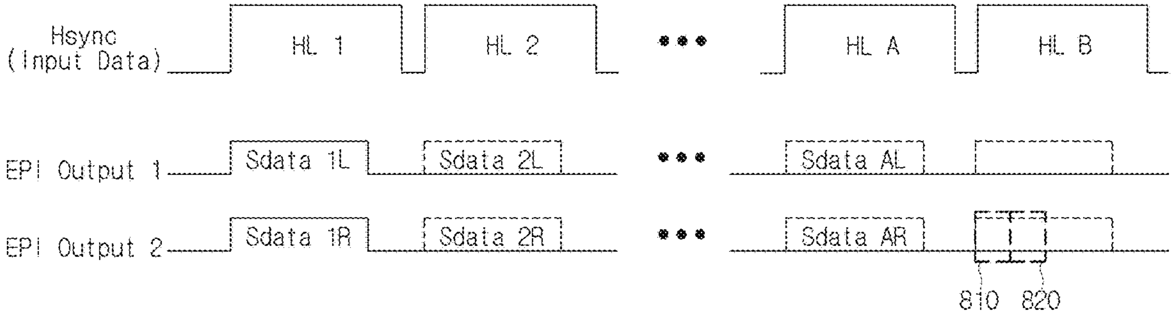

FIGS. 11 and 12 are block diagrams showing image data output from a first EPI output unit and a second EPI output unit according to a second embodiment of the present disclosure.

When the number of data to be updated among the left image data Sdata L and the right image data Sdata R of the consecutive horizontal lines HL is half or more the number of data of all horizontal lines HL, the timing controller 200 can transmit all left image data Sdata L of the horizontal line HL through the first EPI output unit EPI Output 1 and transmit all right image data Sdata R of the horizontal line HL through the second EPI output unit EPI Output 2.

Referring to FIGS. 9, 11, and 12, when the number of data to be updated among the left image data Sdata L and the right image data Sdata R of the consecutive horizontal lines HL is less than half the number of data of all horizontal lines HL, the timing controller 200 can transmit only different data through one of the first EPI output unit EPI Output 1 and the second EPI output unit EPI Output 2, and the other can stop the output.

In other words, the first EPI output unit EPI Output 1 can resume only the outputs of the Bth left image update area 810 and the Bth right image update area 820 of the area P in which the update starts, and the second EPI output unit EPI Output 2 can stop the output of the image data Sdata.

Alternatively, the second EPI output unit EPI Output 2 can resume only the outputs of the Bth left image update area 810 and the Bth right image update area 820 of the area P in which the update starts, and the first EPI output unit EPI Output 1 can stop the output of the image data Sdata.

Figure 13:
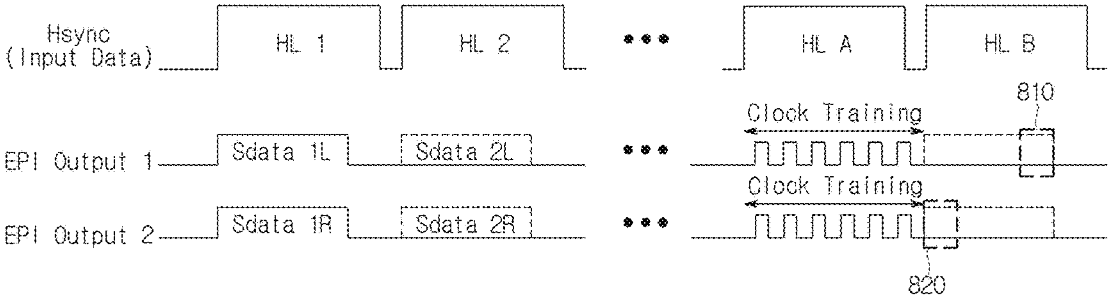
FIGS. 13, 14, and 15 are block diagrams showing clock training and image data that are output from a first EPI output unit and a second EPI output unit according to a third embodiment of the present disclosure.
Figure 14:
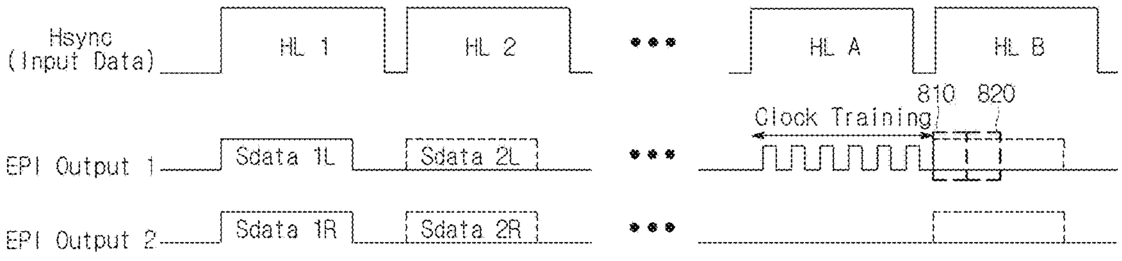
Figure 15:
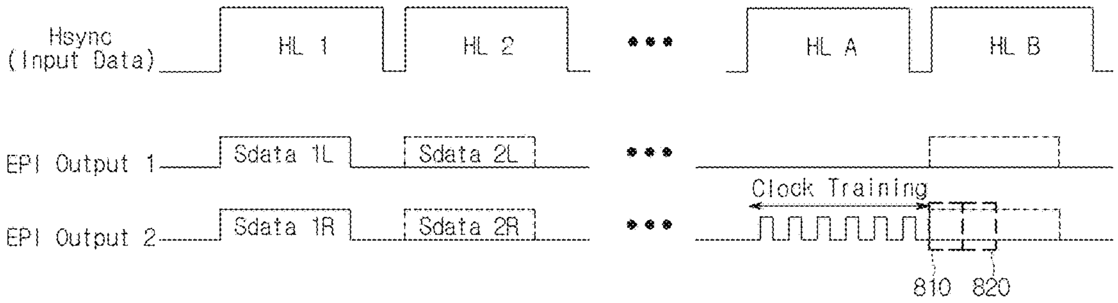

FIGS. 13, 14, and 15 are block diagrams showing clock training and image data that are output from a first EPI output unit and a second EPI output unit according to a third embodiment of the present disclosure.

Referring to FIGS. 13, 14, and 15, the first EPI output unit EPI Output 1 can stop the output from the second left image data Sdata 2L to the Ath left image data Sdata AL of the input data Input Data corresponding to the horizontal lines from the second horizontal line HL 2 to the Ath horizontal line HL A with respect to the horizontal line HL, and the second EPI output unit EPI Output 2 can stop the output from the second right image data Sdata 2R to the Ath right image data Sdata AL of the input data Input Data corresponding to the horizontal lines from the second horizontal line HL 2 to the Ath horizontal line HL A with respect to the horizontal line HL.

Then, the first EPI output unit EPI Output 1 and the second EPI output unit EPI Output 2 can output a clock training signal for a predetermined period before resuming the outputs of the Bth left image update area 810 and the Bth right image update area 820 of the area P in which the update starts. In this case, the predetermined period can be smaller than three horizontal synchronization signals Hsync.

Figure 16:
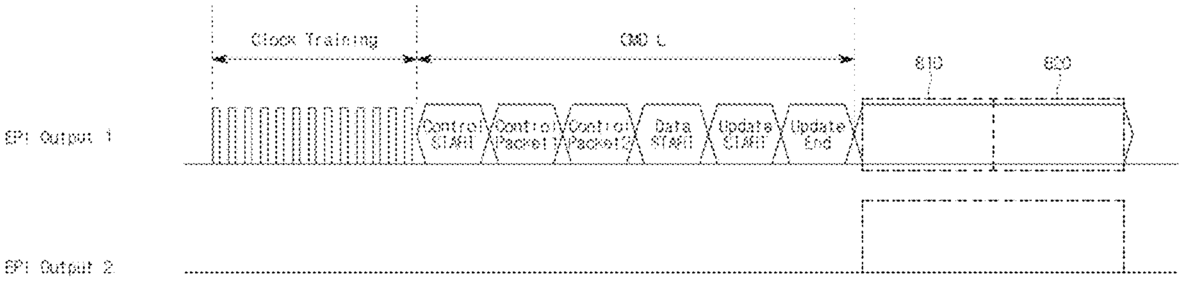
FIG. 16 is a timing diagram showing a structure of command data according to an embodiment of the present disclosure.

FIG. 16 is a timing diagram showing a structure of command data according to an embodiment of the present disclosure.

Referring to FIGS. 14 and 16, the first EPI output unit EPI Output 1 can output the clock training signal for the predetermined period before resuming the outputs of the Bth left image update area 810 and the Bth right image update area 820 of the area P in which the update starts and output left command data CMD L between the clock training signal and the update areas 810 and 820.

The left command data CMD L can consecutively include a control start signal Control Start, a first control packet Control Packet 1, a second control packet Control Packet 2, a data start signal Data Start, an update start signal Update Start, and an update end signal Update End. The update start signal Update Start and the update end signal Update End can define start and end locations of the update areas 810 and 820.

Figure 17:
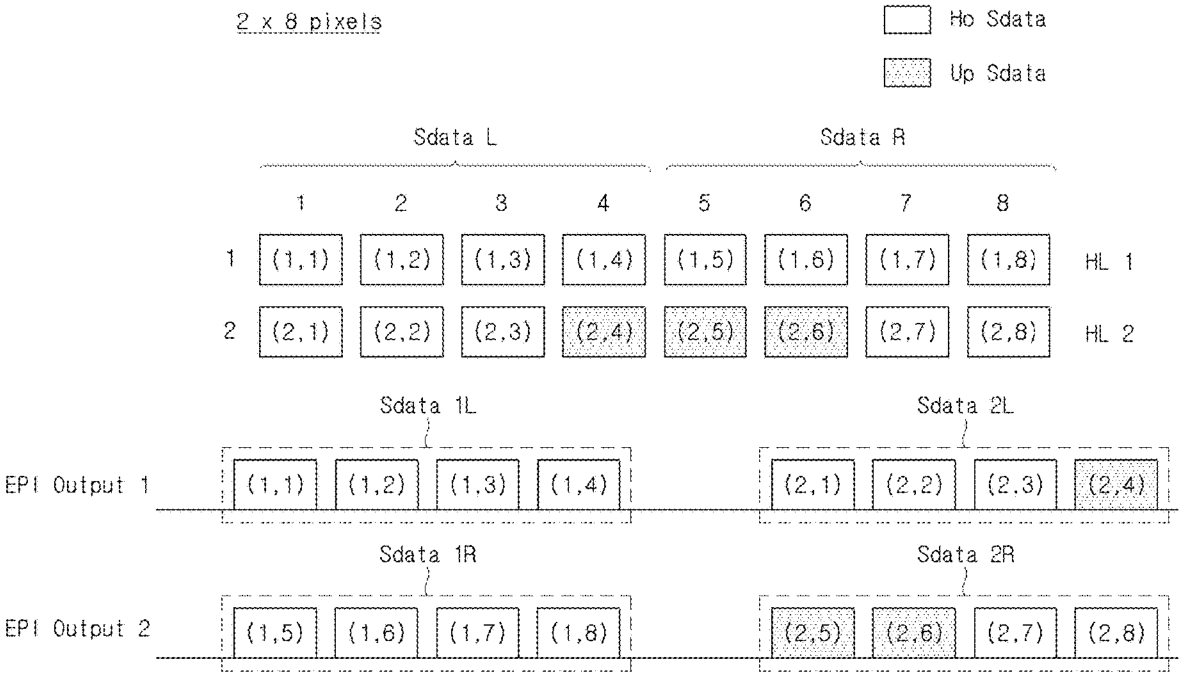
FIG. 17 is a block diagram showing holding data and update data of 2×8 pixels that are output from a first EPI output unit and a second EPI output unit according to a comparative example of the present disclosure.

FIG. 17 is a block diagram showing holding data and update data of 2×8 pixels that are output from a first EPI output unit and a second EPI output unit according to a comparative example of the present disclosure.

Referring to FIG. 17, the first horizontal line HL 1 and the second horizontal line HL 2 can have the resolution of 2×8 pixels in which each line has 8 pixels. The left image data Sdata L of the first horizontal line HL 1 can be defined as (1,1), (1,2), (1,3), and (1,4), and the right image data Sdata R thereof can be defined as (1,5), (1,6), (1,7) and (1,8).

In addition, the left image data Sdata L of the second horizontal line HL 2 can be defined as (2,1), (2,2), (2,3), and (2,4), and the right image data Sdata R thereof can be defined as (2,5), (2,6), (2,7) and (2,8).

The same pixel among the image data Sdata of the first horizontal line HL 1 and the image data Sdata of the second horizontal line HL 2 can be defined as holding data Ho Sdata, and different pixels can be defined as update data Up Sdata. For example, in FIG. 16, the holding data Ho Sdata is (1,1), (1,2), (1,3), (1,4), (1,5), (1,6), (1,7), (1,8), (2,1), (2,2), (2,3), (2,7), and (2,8), and the update data Up Sdata is (2,4), (2,5) and (2,6).

In this case, the first EPI output unit EPI Output 1 can transmit the first left image data Sdata 1L and the second left image data Sdata 2L. The second EPI output unit EPI Output 2 can transmit the first right image data Sdata 1R and the second right image data Sdata 2R.

Figure 18:
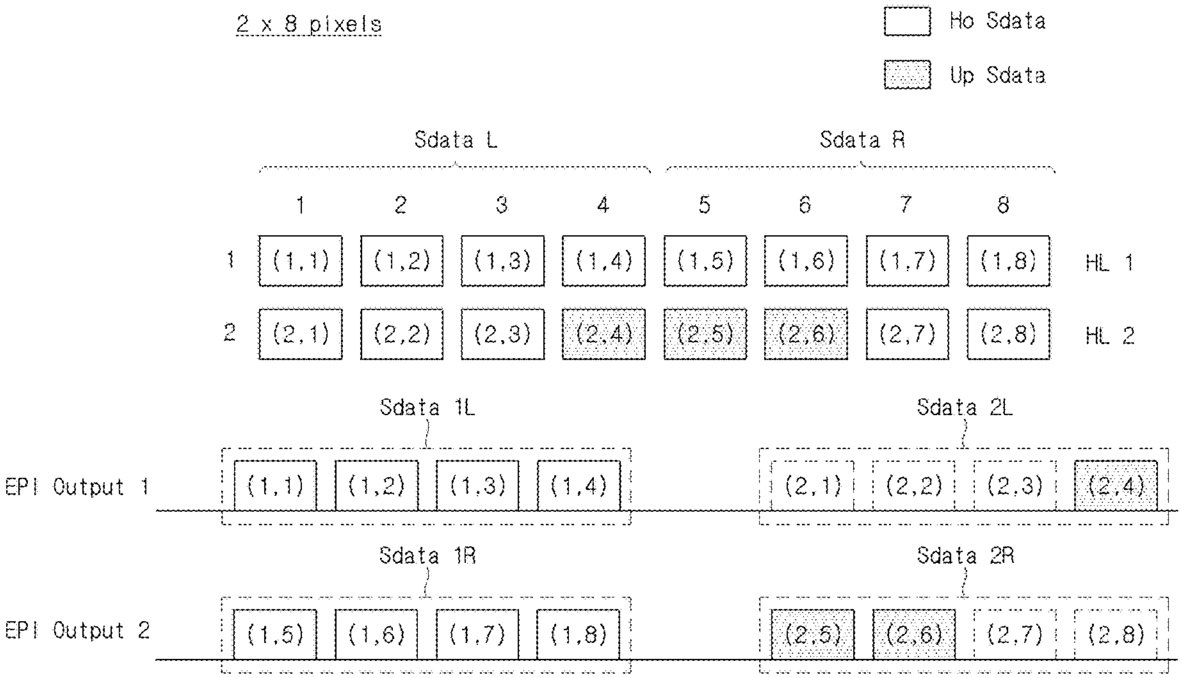
FIG. 18 is a block diagram showing holding data and update data of 2×8 pixels that are output from the first EPI output unit and the second EPI output unit according to the first embodiment of the present disclosure.

FIG. 18 is a block diagram showing holding data and update data of 2×8 pixels that are output from the first EPI output unit and the second EPI output unit according to the first embodiment of the present disclosure.

Referring to FIG. 18, the first EPI output unit EPI Output 1 can output only (2,4) that is the left image update data Up Sdata among the second left image data Sdata 2L after outputting the first left image data Sdata 1L.

In addition, the second EPI output unit EPI Output 2 can output only (2.5) and (2,6) that are the right image update data Up Sdata among the second right image data Sdata 2R after outputting the first right image data Sdata 1R.

Figure 19:
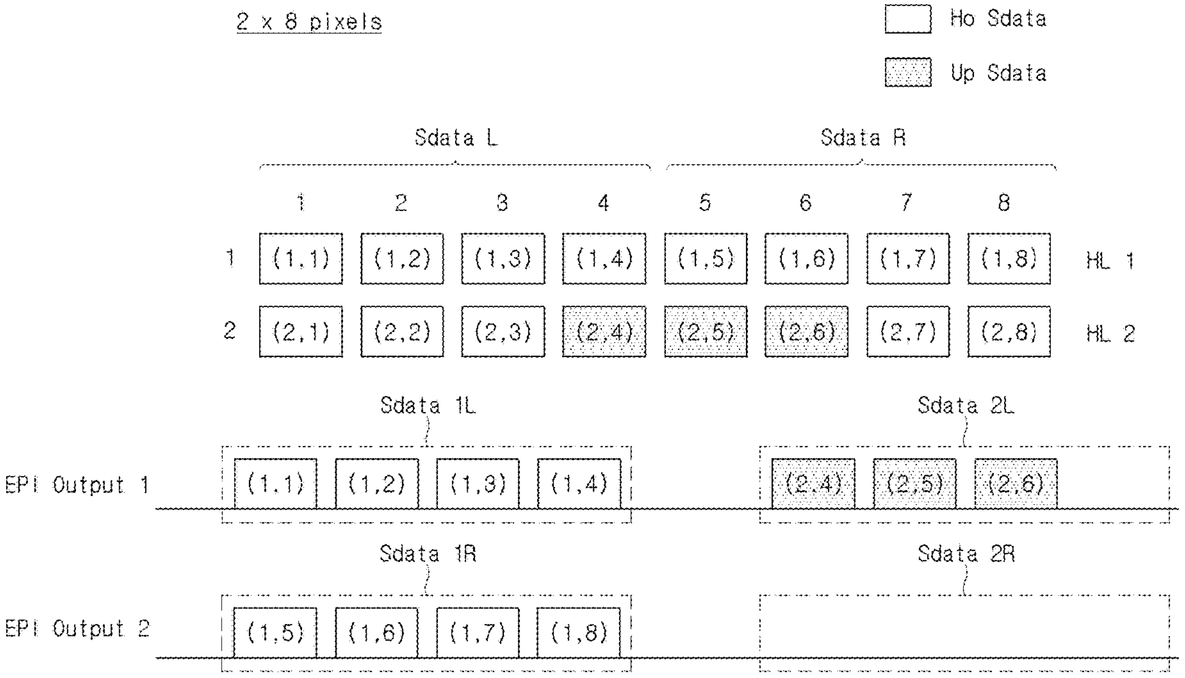
FIGS. 19, and 20 are block diagrams showing holding data and update data of 2×8 pixels that are output from the first EPI output unit and the second EPI output unit according to the second embodiment of the present disclosure.
Figure 20:
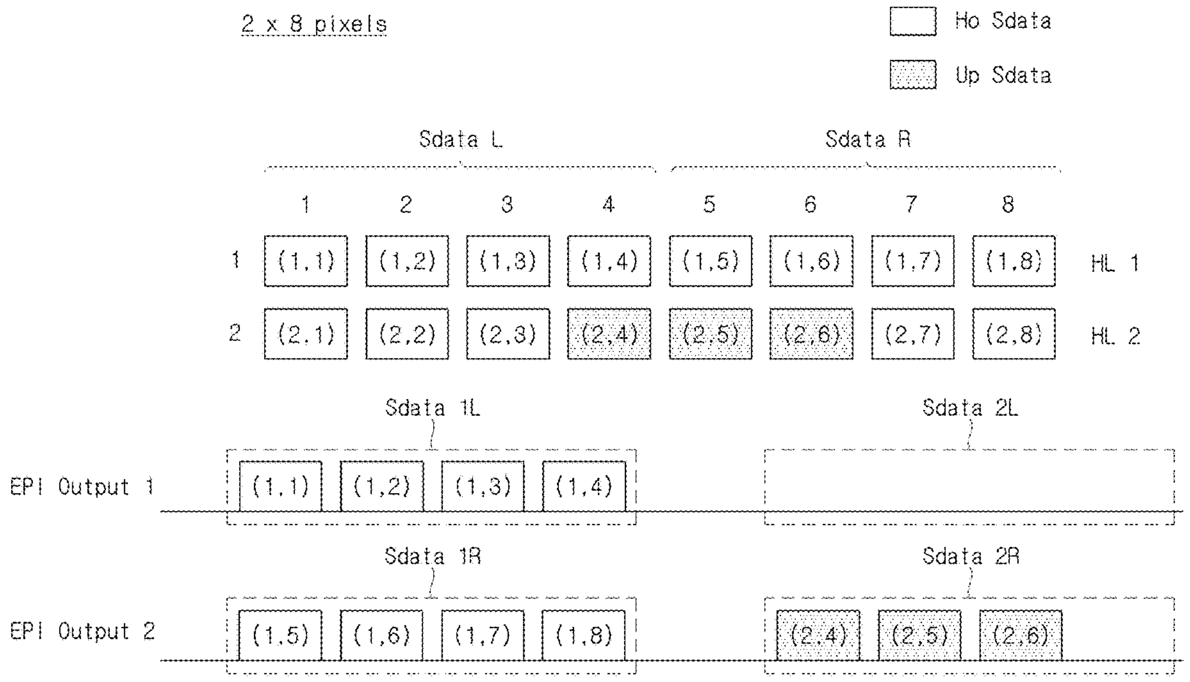

FIGS. 19 and 20 are block diagrams showing holding data and update data of 2×8 pixels that are output from the first EPI output unit and the second EPI output unit according to the second embodiment of the present disclosure.

Referring to FIG. 19, the first EPI output unit EPI Output 1 can output only (2,4) that is the left image update data Up Sdata among the second left image data Sdata 2L and only (2.5) and (2,6) that are the right image update data Up Sdata among the second right image data Sdata 2R after outputting the first left image data Sdata 1L.

In addition, the second EPI output unit EPI Output 2 can stop the output at the time of outputting the second right image data Sdata 2R after outputting the first right image data Sdata 1R, thereby reducing consumed power.

Referring to FIG. 20, the second EPI output unit EPI Output 2 can output only (2,4) that is the left image update data Up Sdata among the second left image data Sdata 2L and only (2.5) and (2,6) that are the right image update data Up Sdata among the second right image data Sdata 2R after outputting the first right image data Sdata 1R.

In addition, the first EPI output unit EPI Output 1 can stop the output at the time of outputting the second left image data Sdata 2L after outputting the first left image data Sdata 1L, thereby reducing consumed power.

According to the display device according to the embodiments, it is possible to reduce the consumed power by efficiently using the output of the timing controller.

The above description and the accompanying drawings are merely illustrative of the technical spirit of the present disclosure, and those skilled in the art to which the present disclosure pertains can perform various changes or modifications, such as coupling, separation, substitution, and change of components, without departing from the essential characteristics of the present disclosure. Therefore, the embodiments disclosed in the present invention are not intended to limit the technical spirit of the present invention, but for describing it, and the scope of the technical spirit of the present invention is not limited by these embodiments. The scope of the present disclosure should be construed by the appended claims, and all technical spirits within the equivalent range should be construed as being included in the scope of the present disclosure.

What is claimed is:

1. A display device comprising:

a display panel including sub-pixels at intersections of horizontal lines and vertical lines;

a timing controller configured to output left image data among data of the horizontal lines through a first embedded panel interface (EPI) output unit, and output right image data among the data of the horizontal lines through a second EPI output unit; and a data driver configured to output data voltages to data lines based on the left image data and the right image data, wherein the timing controller transmits only different data through at least one of the first EPI output unit or the second EPI output unit, when data of a first horizontal line and data of a second horizontal line that are consecutive are partially different with respect to one of the vertical lines.

2. The display device of claim 1, wherein the timing controller is configured to:

stop the output of the first EPI output unit when the left image data of the first horizontal line and the left image data of the second horizontal line that are consecutive are same; and transmit only different data through the first EPI output unit when the left image data of the first horizontal line and the left image data of the second horizontal line that are consecutive are partially different.

3. The display device of claim 2, wherein the timing controller transmits all the left image data of the horizontal lines through the first EPI output unit, when a number of different data between the left image data of the first horizontal line and the left image data of the second horizontal line that are consecutive, is equal to or greater than half of a number of data of all horizontal lines.

4. The display device of claim 2, wherein the timing controller transmits only different data through one of the first EPI output unit and the second EPI output unit, when a sum of a number of different data between the left image data of the first horizontal line and the left image data of the second horizontal line that are consecutive and a number of different data between the right image data of the first horizontal line and the right image data of the second horizontal line is less than half of a number of data of all horizontal lines.

5. The display device of claim 1, wherein the timing controller is configured to:

stop the output of the second EPI output unit when the right image data of the first horizontal line and the right image data of the second horizontal line that are consecutive are same; and transmit only different data through the second EPI output unit when the right image data of the first horizontal line and the right image data of the second horizontal line that are consecutive are partially different.

6. The display device of claim 5, wherein the timing controller transmits all the right image data of the horizontal lines through the second EPI output unit, when a number of different data between the right image data of the first horizontal line and the right image data of the second horizontal line that are consecutive, is equal to or greater than half of a number of data of all horizontal lines.

7. The display device of claim 1, wherein the timing controller transmits a clock training signal for a first period before the first EPI output unit or the second EPI output unit starts the output.

8. The display device of claim 1, wherein the left image data includes left image update data in which the left image data of the first horizontal line and the left image data of the second horizontal line that are consecutive are partially different, and the first EPI output unit outputs only the left image update data.

9. The display device of claim 8, wherein the first EPI output unit outputs all the left image data when a number of left image update data is equal to or greater than half of a number of data of all horizontal lines.

10. The display device of claim 1, wherein the right image data includes right image update data in which the right image data of the first horizontal line and the right image data of the second horizontal line that are consecutive are partially different, and the second EPI output unit outputs only the right image update data.

11. The display device of claim 10, wherein the second EPI output unit outputs all the right image data when a number of right image update data is equal to or greater than half of a number of data of all horizontal lines.

12. The display device of claim 1, wherein the first EPI output unit outputs all of left image update data and right image update data when a sum of a number of left image update data and a number of right image update data is less than half of a number of data of all horizontal lines, and the second EPI output unit stops the output.

13. The display device of claim 1, wherein the second EPI output unit outputs all of left image update data and right image update data when a sum of a number of left image update data and a number of right image update data is less than half of a number of data of all horizontal lines, and the second EPI output unit stops the output.

14. A timing controller comprising:

a first embedded panel interface (EPI) output unit configured to output left image data among data of a horizontal line; and a second EPI output unit configured to output right image data among the data of the horizontal line, wherein the timing controller transmits only different data through at least one of the first EPI output unit or the second EPI output unit, when data of a first horizontal line and data of a second horizontal line that are consecutive are partially different with respect to a vertical line.

15. The timing controller of claim 14, wherein the first EPI output unit is configured to:

stop the output when left image data of the first horizontal line and left image data of the second horizontal line that are consecutive are same; and transmit only different data when the left image data of the first horizontal line and the left image data of the second horizontal line that are consecutive are partially different.

16. The timing controller of claim 15, wherein the first EPI output unit outputs all the left image data of the horizontal lines, when a number of different data between the left image data of the first horizontal line and the left image data of the second horizontal line that are consecutive, is equal to or greater than half of a number of data of all horizontal lines.

17. The timing controller of claim 14, wherein the second EPI output unit is configured to:

stop the output when right image data of the first horizontal line and right image data of the second horizontal line that are consecutive are same; and transmit only different data when the right image data of the first horizontal line and the right image data of the second horizontal line that are consecutive are partially different.

18. The timing controller of claim 17, wherein the second EPI output unit outputs all the right image data of the horizontal lines, when a number of different data between the right image data of the first horizontal line and the right image data of the second horizontal line that are consecutive, is equal to or greater than half of a number of data of all horizontal lines.

19. The timing controller of claim 14, wherein one of the first EPI output unit and the second EPI output unit outputs only different data, when a sum of a number of different data between left image data of the first horizontal line and left image data of the second horizontal line that are consecutive and a number of different data between right image data of the first horizontal line and right image data of the second horizontal line is less than half of a number of data of all horizontal lines.

20. The timing controller of claim 14, wherein the first EPI output unit or the second EPI output unit outputs a clock training signal for a first period before starting the output.

* * * * *